United States Patent [19]

Yabu

[11] Patent Number: 5,389,704
[45] Date of Patent: Feb. 14, 1995

[54] EPOXY PHOSPHATE ESTER RESIN, ITS PRODUCTION AND COATING COMPOSITION CONTAINING THE RESIN

[75] Inventor: Yoshimitsu Yabu, Gotemba, Japan

[73] Assignee: The Dow Chemical Company, Midland, Mich.

[21] Appl. No.: 90,027

[22] PCT Filed: Nov. 30, 1992

[86] PCT No.: PCT/US92/10197
§ 371 Date: Jul. 15, 1993
§ 102(e) Date: Jul. 15, 1993

[87] PCT Pub. No.: WO93/12156
PCT Pub. Date: Jun. 24, 1993

[30] Foreign Application Priority Data

Dec. 16, 1991 [JP] Japan .................. 3-351848

[51] Int. Cl.⁶ .................. C08K 3/20; C08L 63/02
[52] U.S. Cl. .................. 523/406; 523/409; 523/433; 523/451; 528/89; 528/108; 528/398
[58] Field of Search .................. 528/89, 108, 398; 523/433, 451, 414, 406, 409

[56] References Cited

U.S. PATENT DOCUMENTS 5,086,094 2/1992 Massingill, Jr. .................. 528/108

FOREIGN PATENT DOCUMENTS 0188689 7/1986 European Pat. Off. .

Primary Examiner—Melvyn I. Marquis
Assistant Examiner—D. Aylward

[57] ABSTRACT

The present invention provides a process for preparing an epoxy phosphate ester resin, which comprises (1) reacting an epoxy resin having an average of greater than one vicinal epoxy group with a phosphoric acid source material to obtain an epoxy phosphate ester; and (2) further reacting the obtained epoxy phosphate ester with a phosphoric acid source material. The present invention provides epoxy phosphate ester resins obtained by the above process, which exhibit good water-solubility. The coating compositions containing such epoxy phosphate ester resin show good coating properties such as good corrosion resistance, chemical resistance, heat resistance and flexibility.

9 Claims, No Drawings

EPOXY PHOSPHATE ESTER RESIN, ITS PRODUCTION AND COATING COMPOSITION CONTAINING THE RESIN

TECHNICAL FIELD

The present invention relates to a water-soluble epoxy phosphate ester resin which can be used as a water-borne coating material, its production process and a coating composition containing the resin.

BACKGROUND ART

Epoxy resins have been used in a wide variety of applications such as coating applications, for example, because of their superiority in corrosion resistance, chemical resistance and flexibility. In order to improve workability, the epoxy resins are usually diluted with an organic solvent to decrease their viscosities.

Recently, various laws and regulations regarding use of organic solvents, such as organic solvent intoxication prevention regulations and fire regulations, have become more stringent. Because of such regulations, it is desired to make epoxy resins for coating compositions water soluble or water dispersible. Several attempts have been made to modify conventional epoxy resins which per se are not water soluble. For example, self-dispersion type epoxy resins modified with an acrylic resin have been proposed and disclosed in Japanese Patent Application Laid-Open Gazettes Nos. Sho 55-003,481 and Sho 58-198,513.

Further, for simplification of steps, studies have been carried out to make an epoxy resin per se water dispersible. For example, in Japanese Patent Application Laid-Open Gazette No. Hei 2-212,570, an epoxy resin is reacted with phosphoric acid to make the resin water dispersible. However, phosphoric acid has three hydroxyl groups and thus triesters of phosphoric acid are easily formed. For this reason, to obtain an epoxy phosphate ester resin having low viscosity and good dispersion stability, excess amounts of phosphoric acid must be employed. Therefore, unreacted phosphoric acid may remain in the resin product resulting in problems such as blushing of resultant coatings.

Japanese Patent Publication Gazette No. Hei 1-055,299 discloses an epoxy phosphate ester resin prepared by reacting an epoxy resin with phosphoric acid, and then hydrolyzing the phosphoric acid modified epoxy resin for monoesterification. The resultant resin per se can be made water dispersible. However, the resins have unduly large particle size when dispersed in water, resulting in poor dispersion stability. Accordingly, if the amount of organic solvent used is restricted, sufficient dispersion stability cannot be obtained. In particular, in paints prepared using an aromatic epoxy resin, a completely transparent aqueous solution cannot be obtained. In the case of relatively low molecular weight epoxy resins having a weight average molecular weight of 340 to 4,000, there is a problem that they are difficult to hydrolyze and their viscosities increase when dispersed in water.

In view of the deficiencies of the prior art described above, it would be desirable to provide an epoxy phosphate ester resin which exhibits good water-solubility, and its production process.

It would also be desirable to provide a coating composition having good coating properties such as a good anti-rust property and good flexibility.

SUMMARY OF INVENTION

According to the present invention, there is now provided a process for preparing an epoxy phosphate ester resin, which comprises (1) reacting an epoxy resin having an average of greater than one vicinal epoxy group with a phosphoric acid source material to obtain an epoxy phosphate ester; and (2) further reacting the obtained epoxy phosphate ester with a phosphoric acid source material.

Another aspect of the present invention pertains to an epoxy phosphate ester resin prepared by the above process.

Another aspect of the present invention relates to a coating composition comprising:

(a) the epoxy phosphate ester resin obtained as above;

(b) an acrylic resin and/or a polyester resin, miscible with the epoxy phosphate ester resin;

(c) at least one curing agent; and (d) water and/or an organic solvent.

According to the process of the present invention, water-soluble epoxy phosphate ester resins having low viscosity can be obtained while restricting the amount of free phosphoric acid, diesters of phosphoric acid and triesters of phosphoric acid to a minimum level.

The water-soluble resins of the present invention can be used to form a more stable aqueous solution when compared with conventional epoxy phosphate ester resin. The water-borne coating compositions according to the present invention, provides a resultant coating film with improved corrosion resistance and flexibility as compared with a conventional paint such as an acrylic resin-based paint. Accordingly, the coating compositions of the present invention can be effectively used, particularly, in the fields of coating applications such as spray coating and roll coating.

DETAILED EXPLANATION OF THE INVENTION

In the present invention, any known epoxy resins having an average of more than one epoxy group per molecule, can be used. Suitable epoxy resins include, for example, those having an epoxy equivalent weight of from 170 to 3,500, more suitably from 175 to 1,000, and a weight average molecular weight of from 340 to 18,000, more suitably from 340 to 5,000. Preferred epoxy resins which can be used herein, are those having two vicinal epoxy groups such as diglycidyl ethers of bisphenol A, bisphenol K, bisphenol F, bisphenol S, bisphenol AD, aliphatic phenols and mixtures thereof. The most preferred epoxy resin are diglycidyl ethers of bisphenol A and diglycidyl ethers of aliphatic phenols.

In the present invention, the epoxy resins are not limited to the above-mentioned epoxy resins, but include any known epoxy resins. Such epoxy resins are well described in, for example, U.S. Pat. Nos. 4,289,812, 4,397,970, 4,868,059 and 5,070,174, and "The Handbook of Epoxy Resins" by H. Lee and K. Neville, published in 1967 by McGraw-Hill, New York, all of which are incorporated herein by reference.

As commercially available epoxy resins, D.E.R. ™ 331L; D.E.R. ™ 383J; D.E.R. ™ 661; D.E.R. ™ 664; D.E.R. ™ 732; and D.E.N. ™ 438 (trademarks of The Dow Chemical Company) resins, available from The Dow Chemical Company, can be used.

The epoxy resins which can be used in the present invention may be prepared by the reaction of a commercially available epoxy resin and a phenolic compound having an average of more than one hydroxyl group. In this case, the epoxy resin and the phenolic compound may be used in an amount to provide an epoxy:phenolic component ratio by weight of preferably from 60:40 to 99:1, more preferably from 75:25 to 99:1.

Also, if the amount of the phenolic compound used exceeds 40 percent by weight, the next reaction, i.e., phosphorylation is difficult to conduct.

In the reaction between the epoxy component and the phosphoric acid component, according to the present invention, any known catalyst can be used. Such known catalysts include, for example, imidazoles such as 2-methylimidazole; tertiary amines such as triethylamine, tripropylamine and tributylamine; phosphonium salts such as ethyltriphenylphosphonium chloride, ethyltriphenylphosphonium bromide and ethyltriphenylphosphonium acetate-acetic acid complex; and ammonium salts such as benzyltrimethylammonium chloride and benzyltrimethylammonium hydroxide.

In addition, known catalysts other than the above-mentioned catalysts can be used. Such catalysts include those described in, for example, U.S. Pat. Nos. 4,289,812; 4,397,970 and 4,868,059, all of which are incorporated herein by reference.

In the present invention, acidic catalysts are preferable. The amount of the catalysts used generally ranges from 0.001, preferably 0.01 to 1, preferably to 0.3 percent by weight, based on the total solid weight of the reaction mixture.

In the present invention, the above-mentioned epoxy resin is reacted with a phosphoric acid source material and the reaction product obtained is further reacted with a phosphoric acid source material. The obtained product is then subjected to hydrolysis treatment to produce an epoxy phosphate monoester resin.

Phosphoric acid source materials which can be employed in the present invention include, for example, 100 percent phosphoric acid, the semi-hydrate ($2H_3PO_4 \cdot H_2O$) and aqueous solutions containing at least 18 weight percent $HP_3O_4$ (at least 1 mole $H_3PO_4$ per 25 moles of water). The various condensed forms (polymeric, partial anhydrides) of phosphoric acid, pyrophosphoric acid, orthophosphoric acid and triphosphoric acid can also be used. Preferred are phosphoric acid having an $H_3PO_4$ concentration of from 85 to 120 percent, and more preferred are superphosphoric acids having an $H_3PO_4$ concentration of from 105 to 116 percent.

For the reaction of the epoxy component and the phosphoric acid component, the phosphoric acid source material may be added dropwise to the epoxy component at, for example, 50° C. to 150° C. for a period of from 1, preferably 5 to 110, preferably to 15 minutes. After the dropwise addition, the reaction mixture may be heated and stirred for 1 to 120 minutes. If desired, these procedures may be repeated as many times as necessary.

Water-dispersible epoxy phosphate ester resins can be obtained even if the whole amount of phosphoric acid source material for the two-step reaction is simultaneously reacted in a single step with an epoxy resin. However, in such a case the reaction products have high viscosity and also contain unreacted phosphoric acid, triesters and diesters of phosphoric acid, resulting in poor stability when dispersed in an aqueous solution.

In the present invention, when producing high molecular weight epoxy phosphate ester resins, it is possible to perform a uniform reaction by decreasing the viscosity of the reaction mixture with an organic solvent to improve stirring efficiency.

Suitable solvents for use herein include organic solvents having good compatibility with an epoxy resin and a boiling point higher than 110° C., especially higher than 140° C., Examples of the organic solvents used herein are glycol type solvents such as ethylene glycol and propylene glycol; glycol monoether type solvents such as ethylene glycol monoethyl ether, ethylene glycol monobutyl ether, dipropylene glycol methyl ether, diethylene glycol butyl ether, propylene glycol n-butyl ether; acetate type solvents such as propylene glycol monomethyl ether acetate, butyl acetate and propylene glycol methyl ether acetate; alcohol type solvents such as n-butanol, amyl alcohol and cyclohexanol; ketone type solvents such as cyclohexanone and diisobutyl ketone; and aromatic solvents such as xylene and SOLVESSO ™ 100 (supplied by Exxon Chemical). Of these solvents, a glycol type solvent and an alcohol type solvent are especially preferred. These solvents can be used singly or as a mixture of two or more thereof. The non-volatiles concentration of the diluted reaction system is preferably from 50 to 100 percent, based on the total reaction mixture. The higher solids concentration is preferable within the viscosity range where the reaction mixture is not gelled.

In the reaction between the above-mentioned phosphoric acid component and the above-mentioned epoxy component, in the first reaction step an epoxy resin may be reacted with a phosphoric acid source material in an amount to provide from 0.2 to 0.4, preferably from 0.25 to 0.35 hydroxyl group per epoxy group; and in the second reaction step the obtained epoxy phosphate ester is reacted with a phosphoric acid source material in an amount to provide from 0.05 to 0.4, preferably from 0.05 to 0.20 hydroxyl group per epoxy group.

More specifically, in the case of using 100 percent phosphoric acid, the amount of the phosphoric acid source material used for one reaction may preferably range from 0.1 to 6.0 percent by weight, more preferably from 0.3 to 5.5 percent by weight, most preferably from 0.4 to 4.8 based on the total solid content of the reaction mixture. If the amount of the phosphoric acid source material used is less than 0.1 percent by weight, the resultant resins have a large amount of unreacted epoxy groups, resulting in increased viscosity or poor dispersion stability when dispersed in water. If the amount of unreacted epoxy groups exceeds 6.0 percent by weight, gelation may occur during the reaction or free phosphoric acid will be formed during the next reaction step. These are disadvantageous and free phosphoric acid will cause blushing when a coating of the resultant resin is subjected to retort treatment.

The phosphoric acid source materials per se can be added dropwise. However, it is effective to use the phosphoric acid source material diluted with a hydroxylic solvent such as the above-mentioned glycol monoether type solvent or a mixture thereof. The use of the hydroxyl group-containing solvents prevents self-condensation of the phosphoric acid source materials, resulting in a more uniform reaction. These solvents can be used in an amount to provide a molar ratio of the solvent to the phosphoric acid source material of at least 2:1, preferably at least 4:1.

The epoxy phosphate ester resins prepared as above are mainly in the form of triesters or diesters, and thus can be changed to monoesters by subjecting them to partial hydrolysis to reduce them to monoesters. Monoesterification reduces the viscosity of the resultant hydrolyzed modified epoxy phosphate ester resin to make handling easier.

Further, the phosphate groups existing at the end of molecules can provide good corrosion resistance inherently possessed by the phosphoric acid. Further, the phosphoric acid residues may catalyze curing of the resultant coated film and provide flexibility to the coated film. The hydrolyzed, modified epoxy phosphate ester resins may contain a small quantity of diesters, triesters and free phosphoric acid in addition to monoesters, but normally contain almost no epoxy groups.

In the process of the present invention, the epoxy phosphate ester resins can be made water-soluble by adding at least one amine compound to the resin to adjust its pH to between 6 and 11, adding dropwise water, and then stirring the obtained product. If the pH of the adjusted epoxy phosphate ester resin is outside the pH range of 6 to 11, the resultant solution may have poor stability.

Suitable amine compounds which can be used in the present invention include those described in U.S. Pat. Nos. 4,289,812 and 4,397,970; for example, alkanol amines such as N,N-dimethylethanol amine. Particularly preferred is an amine mixture prepared by mixing N,N-dimethylethanol amine and diethanol amine at a weight ratio of between 50:50 and 70:30.

In the present invention, neutralization can be effected at room temperature. However, if the reaction mixture has high viscosity due to its high solids content or use of resins of high molecular weight, the reaction mixture can be heated at a temperature below the boiling point of the amine compound used.

In the present invention, the epoxy phosphate ester resin may be incorporated with, for example, an acrylic resin and/or a polyester resin, a curing agent, water and/or an organic solvent to prepare a coating composition.

Acrylic resins which can be used in the present invention include any acrylic resin known as a coating material, such as a polymer of alkyl acrylate or methacrylate and a monomer copolymerizable therewith. Suitable alkyl (meth)acrylate polymers include, for example, those prepared from methyl (meth)acrylate, ethyl (meth)acrylate, butyl (meth)acrylate and 2-ethylhexyl (meth)acrylate and a monomer copolymerizable with these esters. Suitable copolymerizable monomers used herein include, for example, (meth)acrylic acid, maleic acid, itaconic acid, 2-hydroxyethyl (meth)acrylate, hydroxypropyl (meth)acrylate, acryl-amide, N-methylol acryl-amide, styrene, vinyltoluene, acrylonitrile and vinylacetate.

Polyester resins which can be used in the present invention include polyester resins known as coating materials, which are prepared from a suitable alcohol component and a suitable acid component. Suitable alcohol components include, for example, ethylene glycol, diethylene glycol, polyethylene glycol, propylene glycol, dipropylene glycol, polypropylene glycol, neopentyl glycol, butanediol, 1,5-pentanediol, 1,6-hexanediol, 1,4-cyclohexanedimethanol, glycerol, anthrol, trimethylolethane, hexanetriol and pentaerythritol. Suitable acid components include, for example, phthalic acid, tetrahydrophthalic acid, hexahydrophthalic acid, trimellitic acid, pyromellitic acid, isophthalic acid, terephthalic acid, maleic acid, fumaric acid, itaconic acid, adipic acid, azelaic acid, sebacic acid, succinic acid and anhydrides of these acids.

Curing agents which can be incorporated into the composition for solvent-borne coatings according to the present invention include, for example, amino resins such as melamine-formaldehyde and urea-formaldehyde; alkyl-etherified amino resins such as those prepared from the etherification of the above amino resins with lower alcohols such as methanol or ethanol; polyisocyanates such as isophorone diisocyanate and m-xylene diisocyanate; blocked isocyanates such as those formed by introducing blocking agents such as alcohols, including methanol, or phenols, including cresol, into the above polyisocyanates; and alkyl-etherified phenol resins such as an aryl ether monomethylol phenol. For water-borne coatings, any known water-soluble curing agents can be used.

The epoxy resins of the present invention can be used as raw materials for water-borne coating compositions, which are considered preferable from an environmental view point, as well as raw materials for solvent-borne coating compositions.

The epoxy phosphate ester resins of the present invention can be incorporated with water and known water-soluble curing agents to prepare a water-borne coating composition.

The epoxy phosphate ester resins of the present invention can also be used to prepare a solvent-borne coating composition. Suitable organic solvents which can be used as diluent to adjust viscosity include, for example, the above-mentioned glycol-type solvents, glycol monoether-type solvents, alcohol-type solvents, aromatic-type solvents and ketone-type solvents (such as methyl ethyl ketone, methyl isobutyl ketone and cyclohexanone). These solvents can be used alone or in combination.

The epoxy phosphate ester resins of the present invention can be used in combination with a known epoxy resin as long as the resin mixture keeps good performance derived from the epoxy phosphate ester resins.

The preferable component ratio of a coating composition of the present invention is as follows:

(a) from 1, preferably 5 to 30, preferably 20 percent by weight of an epoxy phosphate ester resin;

(b) from 50, preferably 70 to 90, preferably 80 percent by weight of an acrylic resin and/or a polyester resin; and (c) from 10, preferably 15 to 30, preferably 20 percent by weight of a curing agent for Components (a) and (b).

To the above composition, (d) water and/or an organic solvent may be added to provide a volatiles content of, for example, from 10, preferably 15 to 80, preferably 40 percent by weight.

If desired, these coating compositions may comprise an appropriate amount of a pigment, plasticizer, coloring agent, flow modifier and/or curing accelerator.

EXAMPLES AND COMPARATIVE EXAMPLES

The present invention will now be described in more detail with reference to the following Examples and Comparative Examples, which are not to be construed as limiting the invention.

In the Examples and Comparative Examples, all of the percentages and parts are by weight unless otherwise indicated.

Example 1

A reaction vessel equipped with a condenser was charged with 777 parts of a diglycidyl ether of bisphenol A (D.E.R. TM 331 resin: trademark of The Dow Chemical Company), 323 parts of bisphenol A and 0.2 parts of a catalyst, a 70 percent methanol solution of ethyltriphenyl phosphonium acetate-acetic acid complex. The reaction was carried out in a nitrogen current at 175° C. for 1 hour.

A mixed solvent containing DOWANOL TM PM (propylene glycol methyl ether) and DOWANOL TM DPM (dipropylene glycol methyl ether) (1:1 weight ratio) was then added to the reaction mixture to adjust the solids concentration to 90 percent and to cool the reaction mixture to 125° C. Then, 20 parts of a solution prepared by diluting superphosphoric acid having a concentration of 105 percent in 4 times as many moles of the same mixed solvent (DOWANOL TM PM and DOWANOL TM DPM 1:1 weight ratio) as phosphoric acid, were added dropwise to the reaction product over a period of 30 minutes. To the reaction product obtained, 20 parts of the same superphosphoric acid solution were added in the same way as above for further reaction, under the same conditions.

Then, 20 parts of water were added to the reaction product for hydrolysis to obtain an epoxy phosphate monoester resin. The epoxy phosphate ester resin obtained as above was subjected to neutralization with dimethylethanol amine, and then incorporated into water to prepare a transparent aqueous solution having a volatiles content of 34.2 percent and pH of 7.3.

To the aqueous solution of the epoxy phosphate ester resin obtained, as indicated in Table 1, an acrylic resin and a melamine curing agent were added. Further, to the mixture, deionized water was added for dilution to prepare a coating composition having volatiles content of 25 percent.

Example 2

In the fashion described in Example 1 and except as otherwise stated, using the same reactants, amounts and conditions, 407 parts D.E.R. TM 732 aliphatic diglycidyl ether resin supplied by The Dow Chemical Company and 43 parts bisphenol A were reacted in the presence of 0.6 parts of the same phosphonium-acid complex catalyst.

The reaction system was cooled to 125° C. and 9 parts of the same 1:4 superphosphoric acid:mixed solvent solution were added dropwise over 30 minutes and then 9 parts of the superphosphoric acid solution were further added. The reaction product was hydrolyzed with 10 parts water, subjected to the amine neutralization and diluted with water to a transparent 32.2 percent volatiles solution of pH 7.5.

As in Example 1, a coating composition, indicated in Table 1, of 25 percent volatiles content was prepared.

Example 3

In the same fashion, 100 parts of D.E.R. TM 331 diglycidyl ether supplied by The Dow Chemical Company was reacted by dropwise addition of 4.8 parts of the superphosphoric acid solution over 20 minutes at 125° C. To the resulting product at 125° C., another 4.8 parts of the superphosphoric acid solution were added dropwise and then 3 parts water were added to hydrolyze the product. Neutralization with the dimethylethanol amine and dilution with water was carried out to yield a transparent solution of pH 7.5 having 35.6 percent volatiles content.

As in Example 1, a coating composition, indicated in Table 1, of 25 percent volatiles content was prepared.

Example 4

A coating composition was prepared in the same way as in Example 3 except that the kind of acrylic resin was changed as indicated in Table 1.

Reference Example

A reaction vessel equipped with a condenser was charged with 388 parts of an aliphatic diglycidyl ether (D.E.R. TM 331: trademark of The Dow Chemical Company), 112 parts of bisphenol A and 0.1 parts of a 70 percent methanol solution of ethyltriphenyl phosphonium acetate-acetic acid complex. The reaction was carried out in a nitrogen current at 175° C. for 1 hour. Thereafter, a mixed solvent containing DOWANOL TM PM and DOWANOL TM DPM (1:1 weight ratio) was added to the reaction mixture to adjust a solid concentration to 70 percent and to cool the reaction mixture to 125° C.

Then, a solution prepared by diluting 10 parts of superphosphoric acid having a concentration of 105 percent in an amount 4 times as much moles of a mixed solvent containing DOWANOL TM PM and DOWANOL TM DPM (1:1 weight ratio) as that of superphosphoric acid, were added dropwise to the reaction product over a period of 30 minutes for reaction.

Then, 10 parts of water were added to the reaction product obtained for hydrolysis to obtain an epoxy phosphate ester resin. The epoxy phosphate ester resin obtained was subjected to neutralization with dimethylethanol amine, and then incorporated with water. However, the viscosity of the suspension liquid increased and it became a white solid product.

From the results of this Reference Example, it was found that the products obtained through a single reaction with superphosphoric acid exhibit poor water-solubility compared with those obtained through a two-step reaction with superphosphoric acid as in the present Examples 1–4.

Comparative Example 1

The emulsion type acrylic resin (AR-1) used in Examples 1 to 3 was incorporated with a melamine curing agent as indicated in Table 1. To the mixture, deionized water was added for dilution of the volatiles content to 25 percent, to prepare a coating composition.

Comparative Example 2

The emulsion type acrylic resin (AR-2) used in Example 4 was incorporated with a melamine curing agent as indicated in Table 1. Deionized water was added to the mixture for dilution so that the volatiles content became 25 percent, to prepare a coating composition.

Next, a coating composition consisting of an acrylic resin and a curing agent was prepared as comparison.

TABLE 1

|  | Kind of Resin | | Component Ratios (wt. %) | |
| --- | --- | --- | --- | --- |
|  | Epoxy Resin | Acrylic Resin | Epoxy Resin/ Acrylic Resin | CYMEL TM 303 |
| Ex. 1 | Bis A Based | AR-1 | 70/15 | 15 |
| Ex. 2 | Aliphatic | AR-1 | 70/15 | 15 |
| Ex. 3 | Bis A Based | AR-1 | 70/15 | 15 |
| Ex. 4 | Bis A Based | AR-2 | 70/15 | 15 |
| Comp. | — | AR-1 | 0/85 | 15 |

TABLE 1-continued

| | Kind of Resin | | Component Ratios (wt. %) | |
|---|---|---|---|---|
| | Epoxy Resin | Acrylic Resin | Epoxy Resin/ Acrylic Resin | CYMEL ™ 303 |
| Ex. 1 | | | | |
| Comp. Ex. 2 | — | AR-2 | 0/85 | 15 |

AR-1: Emulsion type acrylic resin having a MW of 20,000.
AR-2: Water-soluble acrylic resin having a MW of 9,600.
CYMEL ™ 303: Melamine hardener supplied by Mitsui-Cyanamid.

EXPERIMENT

The coating compositions prepared as above were coated on a tin-plated steel sheet, and heated to 180° C. for 10 minutes for heat curing. Then, the properties of the resultant coated films were evaluated. In the experiment, pigment was not used in order to evaluate the properties of the resins themselves.

The evaluation methods used in the experiment are as follows.

T-Bend Test

A coated specimen (3 cm×3 cm) is bent so that the coated surface appears outside, and a plurality of tin plates (spacer) having the same thickness as that of the specimen are inserted inside of the bent specimen. Then, the bent specimen is pressed. The bent specimen is re-pressed after the number of the spacers is reduced, one by one, until a crack occurs in the coated film. The minimum number of the spacers where a crack did not occur is regarded as an index of flexibility.

Xylene Double Rubbing Test

A specimen is subjected to a rubbing test using a rubbing tester with xylene at a load of 2 pounds. The maximum number of rubbing is set as 100 times.

Boiling Water Resistance

Pencil hardness is measured before and after a coated specimen is immersed in a boiling water for a period of 2 hours. The pencil hardness test is conducted in accordance with JIS K-5400.

Salt Spray Test

In accordance with JIS K-5400, width of rust formed 500 hours after spraying is measured.

The results of the testing, carried out on coatings prepared from the coating compositions described above, are shown in Table 2.

TABLE 2

| Example/ Comp. Ex. | T-Bend Test | Xylene Double Rubbing Test | Boiling Water Resistance (Before/After) | Salt Spray Test (500 hrs, Rust width in mm) |
|---|---|---|---|---|
| Example 1 | 1T | >100 | H/HB | 1.0 |
| Example 2 | 1T | >100 | H/HB | 2.0 |
| Example 3 | 2T | >100 | H/HB | 2.0 |
| Example 4 | 2T | >100 | H/H | 3.5 |
| Comp. Ex. 1 | 2T | >100 | H/HB | 4.0 |
| Comp. Ex. 2 | 3T | >100 | H/B | 5.5 |

Apparent from the results, as shown in Table 2, it was found that the water-soluble epoxy resins of the present invention show good flexibility and corrosion resistance without sacrificing other properties such as chemical resistance and heat resistance.

INDUSTRIAL APPLICABILITY

The epoxy phosphate ester resins of the present invention exhibit an improved curing time, corrosion resistance, chemical resistance, flexibility and hardness, and can provide a transparent aqueous solution when the solution is neutralized. The resins exhibit good stability when dissolved in water.

Accordingly, the coating compositions of the present invention can be effectively used in coating applications such as spray coating and roll coating. Particularly, the coating compositions show good performance in the fields of can coating, coil coating and post coating.

More specifically, the coating compositions according to the present invention can be effectively used as coating materials on steel based plates or sheets such as a tin-plated steel (TPS) sheet, tin-free steel (TFS) sheet and galvanized steel sheet; and non-steel based plates or sheets such as an aluminum sheet.

Also, the resin compositions of the present invention can be effectively used as primers for substrates. In this case, conventional coating materials may be coated thereon as top coating layers. Such coating materials for top coatings include, for example, an alkyd resin-based paint, polyester resin-based paint, thermosetting acrylic resin-based paint, vinyl resin-based paint and silicon resin-based paint.

Further, the resin compositions of the present invention can be used as coating materials for top coating when an aqueous solution of the resin composition is blended with a water-soluble or water-dispersible acrylic resin or polyester resin. Therefore, the epoxy resins of the present invention can be used as additive for an acrylic resin-based paint or a polyester resin-based paint, in which an epoxy resin was not previously used.

I claim:

1. A process for preparing an epoxy phosphate ester resin, which comprises (1) reacting an epoxy resin having an average of greater than one vicinal epoxy group with a phosphoric acid source material selected from the group consisting of 100 percent phosphoric acid, a semi-hydrate of phosphoric acid, a polymeric phosphoric acid, a partial anhydride of phosphoric acid, pyrophosphoric acid, orthophosphoric acid, triphosphoric acid, superphosphoric acid and a mixture thereof to obtain an epoxy phosphate ester; and (2) then adding additional phosphoric acid source material to the epoxy phosphate ester obtained in step (1); and (3) further reacting the epoxy phosphate ester obtained in step (1) with the additional phosphoric acid source material.

2. A process according to claim 1, wherein in the first reaction the epoxy resin is reacted with a phosphoric acid source material in an amount to provide from about 0.2 to about 0.4 hydroxyl group per epoxy group; and in the second reaction the obtained epoxy phosphate ester is reacted with a phosphoric acid source material in an amount to provide from about 0.05 to about 0.4 hydroxyl group per epoxy group.

3. A process according to claim 1, wherein each of the first and second reaction are carried out at 50° C. to 150° C. for a period of from 1 to 110 minutes.

4. A process according to claim 1, which further comprises subjecting the epoxy phosphate ester resin obtained to hydrolysis treatment with water to produce an epoxy phosphate monoester; and then subjecting the obtained epoxy phosphate monoester to neutralization treatment.

5. A process according to claim 1, wherein the epoxy resin is a glycidyl ether of bisphenol A, glycidyl ether of bisphenol K, glycidyl ether of bisphenol F, glycidyl ether of bisphenol S, glycidyl ether of bisphenol AD or a mixture thereof.

6. An epoxy phosphate ester resin prepared by the process of claim 1.

7. A coating composition comprising:
(a) the epoxy phosphate ester resin of claim 6;
(b) an acrylic resin or a polyester resin, miscible with the epoxy phosphate ester resin;
(c) at least one curing agent; and
(d) water.

8. A coating composition comprising:
(a) the epoxy phosphate ester resin of claim 6;
(b) an acrylic resin or a polyester resin, miscible with the epoxy phosphate ester resin;
(c) at least one curing agent; and
(d) an organic solvent.

9. The epoxy phosphate ester resin of claim 6 which is water-soluble.

* * * * *